United States Patent
Banno et al.

(10) Patent No.: US 8,967,321 B2
(45) Date of Patent: Mar. 3, 2015

(54) ELECTRIC POWER STEERING APPARATUS

(71) Applicant: Honda Motor Co., Ltd., Minato-Ku, Tokyo (JP)

(72) Inventors: Yoshifumi Banno, Wako (JP); Masahiko Niki, Wako (JP); Takeshi Iijima, Wako (JP); Kazutaka Saito, Wako (JP); Yoshinobu Mukai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/288,564

(22) Filed: May 28, 2014

(65) Prior Publication Data

US 2014/0353073 A1    Dec. 4, 2014

(30) Foreign Application Priority Data

May 28, 2013    (JP) .................................. 2013-111843

(51) Int. Cl.
    *B62D 5/04*    (2006.01)
(52) U.S. Cl.
    CPC .................................... *B62D 5/0481* (2013.01)
    USPC ......................................................... 180/446
(58) Field of Classification Search
    CPC .................................. B62D 5/046; B62D 6/08
    USPC .......................................... 180/446; 701/4, 3
    See application file for complete search history.

(56) References Cited

U.S. PATENT DOCUMENTS

| | | | | |
|---|---|---|---|---|
| 6,390,229 | B1 * | 5/2002 | Kaji ............................... | 180/443 |
| 6,816,765 | B2 * | 11/2004 | Yamamoto et al. ............. | 701/41 |
| 8,467,938 | B2 * | 6/2013 | Oya ................................. | 701/41 |
| 2011/0098889 | A1 * | 4/2011 | Oya ................................. | 701/41 |

FOREIGN PATENT DOCUMENTS

| | | |
|---|---|---|
| JP | 2010-195142 A | 9/2010 |
| JP | 2011-162145 A | 8/2011 |
| JP | 2012-046047 A | 3/2012 |

* cited by examiner

*Primary Examiner* — Tony Winner
(74) *Attorney, Agent, or Firm* — Carrier Blackman & Associates, P.C.; Joseph P. Carrier; William D. Blackman (57) ABSTRACT

An electric power steering apparatus includes an electric motor configured to apply an assist torque to an steering system of a motor vehicle, a rotational quantity detection unit for detecting a rotational quantity of the electric motor while the rotational quantity detection unit is in a wake-up state, and a counter electromotive voltage detection unit for detecting a counter electromotive voltage of the electric motor. When a main power supply of the electric power steering apparatus is turned off, the rotational quantity detection unit enters into a sleep state, and when a prescribed condition is established based on the counter electromotive voltage detected by the counter electromotive voltage detection unit, the rotational quantity detection unit transitions from the sleep state to the wakeup state.

5 Claims, 4 Drawing Sheets

ELECTRIC POWER STEERING APPARATUS

FIELD OF THE INVENTION

The present invention relates to an electric power steering apparatus, and more particularly to a technique that can detect the rotational quantity of an electric motor of the electric power steering apparatus.

BACKGROUND OF THE INVENTION

Vehicles such as automobiles may be equipped with an electric power steering apparatus, which can generate an assist torque for assisting a steering torque generated in a steering system during operation of a steering wheel by the driver. By thus generating the assist torque, the electric power steering apparatus is able to assist steering operation of the driver, thereby reducing loads on the driver.

One example of such electric power steering apparatus is disclosed in Japanese Patent Application Laid-open Publication (JP-A) No. 2010-195142. The disclosed electric power steering apparatus includes a controller that can set an assist torque based on a vehicle speed detected by a vehicle speed sensor, a steering angle detected by a steering angle sensor, and a road surface condition estimated by a road surface condition estimating unit. The steering angle is thus used in the disclosed electric power steering apparatus. Additional to the electric power steering apparatus shown in JP 2010-195142, a sideslip prevention device VSA disclosed in Japanese Patent Application Laid-open Publication (JP-A) No. 2011-162145 also uses the steering angle for operation thereof.

The steering angle means a relative steering angle that represents only a rotational angle of the steering wheel, or an absolute steering angle that represents a rotational angle of the steering wheel and the number of revolutions of the steering wheel. The absolute steering angle can be detected by a mechanical steering angle sensor provided in the vicinity of the steering wheel. The mechanical steering angle sensor may be replaced by a main circuit of an electronic control unit (ECU) disclosed in Japanese Patent Application Laid-open Publication (JP-A) No. 2012-46047, wherein when a key switch is turned on, a resolver detects a rotational angle and the number of revolutions (absolute electric angle) of a brushless motor, and the main circuit calculates an absolute steering angle using the absolute electric angle of the brushless motor and a reduction ratio of a reduction dear.

The ECU disclosed in JP 2012-46047 includes a backup circuit which is configured to detect only the number of revolutions of the brushless motor when the key switch is turned off (namely, when a main power supply of the electric power steering apparatus is turned off). In other words, the resolver should be intermittently excited in order to detect the number of revolutions of the brushless motor even when the steering wheel is operated while the key switch is in the off state.

This means that even when the key switch is in the off state, electric power is necessary for achieving intermittent excitation of the resolver. If the intermittent-exciting period is set to positive infinity to thereby terminate detection of the number of revolutions of the brushless motor by the resolver, the electricity consumption of the backup circuit will be reduced. However, since the resolver is no longer possible to detect a change in the number of revolutions (count-up or count-down) of the brushless motor, when the key switch is switched from the off state to the on state, the main circuit will calculate an erroneous absolute steering angle based on an erroneous number of revolutions detected by the backup circuit.

It is therefore an object of the present invention to provide an electric power steering apparatus which is capable of reducing electricity consumption when a rotational quantity of an electric motor is detected while a main power supply of the electric power steering apparatus is in an off state.

SUMMARY OF THE INVENTION

According to one aspect of the present invention, there is provided an electric power steering apparatus, comprising: a main power supply for supplying electric power to the electric power steering apparatus; an electric motor configured to apply an assist torque to an steering system of a motor vehicle; a rotational quantity detection unit for detecting a rotational quantity of the electric motor while the rotational quantity detection unit is in a wake-up state; and a counter electromotive voltage detection unit for detecting a counter electromotive voltage of the electric motor, wherein when the main power supply is turned off, the rotational quantity detection unit enters into a sleep state, and wherein when a prescribed condition is established based on the counter electromotive voltage detected by the counter electromotive voltage detection unit, the rotational quantity detection unit transitions from the sleep state to the wakeup state.

With this arrangement, while the main power supply is in an off state, the electric power steering apparatus can stop operation of the electric motor. In this condition, if a steering wheel of the motor vehicle is operated by the driver, a counter electromotive voltage of the electric motor will be produced. On the other hand, detection of the rotational quantity of the electric motor is not necessary as long as the steering wheel is not operated by the driver. It is therefore sufficient that the rotational quantity detection unit transitions from the sleep state to the wakeup state to thereby perform detection of a rotational quantity of the electric motor only when the prescribed condition is established based on the counter electromotive voltage detected by the counter electromotive detection unit while the main power supply of the electric power steering apparatus is in the off state. In other words, as long as the prescribed condition is not established based on the counter electromotive voltage of the electric motor, the rotational quantity detection unit remains in the sleep state, so that electricity consumption required for detection of the rotational quantity of the electric motor can be reduced.

Preferably, the electric motor comprises a brushless motor, and the counter electromotive voltage detection unit detects the counter electromotive voltage based on a voltage of at least one phase of the brushless motor.

When the steering wheel of the motor vehicle is operated by the driver while the main power supply of the electric power steering apparatus is in the off state, a counter electromotive voltage is produced in each phase voltage of the brushless motor (for example, in a U-phase voltage, V-shape voltage, and W-phase voltage of a three-phase brushless motor). The counter electromotive voltage detection unit is therefore allowed to detect the counter electromotive voltage based on a voltage in at least one phase of the brushless motor.

Preferably, the prescribed condition is a condition where the counter electromotive voltage exceeds a predetermined value.

When the steering wheel of the motor vehicle is operated by the driver while the main power supply of the electric power steering apparatus is in the off state, the counter electromotive voltage of the brushless motor varies to represent a sin wave. Accordingly, when the counter electromotive voltage exceeds the predetermined value, it can be estimated that the steering wheel is operated by the driver. Thus, the prescribed condition is established based on the counter electromotive voltage, and the rotational quantity detection unit transitions from the sleep state to the wakeup state where it can detect a rotational quantity of the electric motor.

Preferably, the prescribed condition is a condition where the counter electromotive voltage inverts.

When the steering wheel of the motor vehicle is operated by the driver while the main power supply of the electric power steering apparatus is in the off state, the counter electromotive voltage of the brushless motor varies to represent a sine wave, as discussed above. Accordingly, when the counter electromotive voltage inverts, it can be estimated that the steering wheel is operated by the driver. The prescribed condition is thus established based on the counter electromotive voltage, and the rotational quantity detection unit transitions from the sleep state to the wakeup state where it can detect a rotational quantity of the electric motor.

Preferably, the prescribed condition is a condition where an integrated value of the counter electromotive voltage exceeds a predetermined value.

When the steering wheel of the motor vehicle is operated by the driver while the main power supply of the electric power steering apparatus is in the off state, the counter electromotive voltage varies to represent a sine wave. Accordingly, when an integrated value of the counter electromotive voltage exceeds a predetermined value, it can be estimated that the steering wheel is operated by the driver. The prescribed condition is thus established based on the counter electromotive voltage, and the rotational quantity detection unit transitions from the sleep state to the wakeup state where it can detect a rotational quantity of the electric motor.

BRIEF DESCRIPTION OF THE DRAWINGS

Certain preferred structural embodiments of the present invention will be described in detail below, by way of example only, with reference to the accompanying drawings, in which like reference numerals designate like parts and in which.

DETAILED DESCRIPTION OF THE PREFERRED EMBODIMENTS

Figure 1:
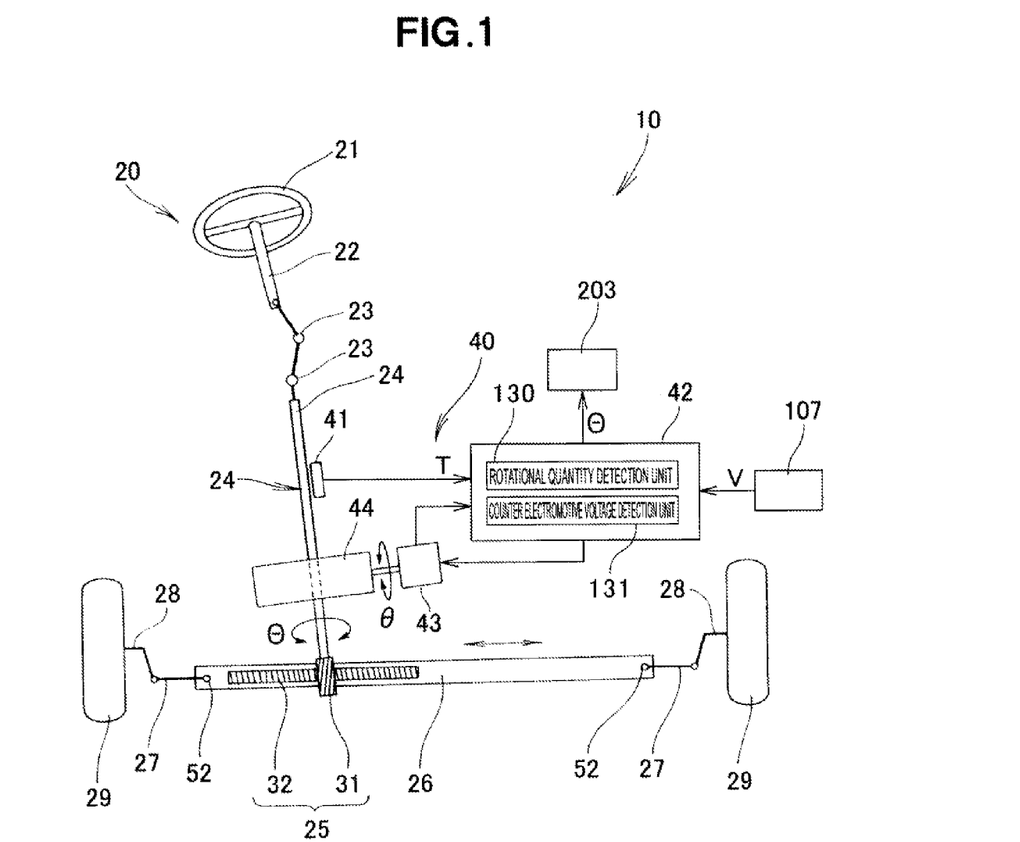
FIG. 1 is a diagrammatical view showing a general configuration of an electric power steering apparatus according to an embodiment of the present invention.

FIG. 1 diagrammatically shows a general configuration of an electric power steering apparatus 10 according to an embodiment of the present invention. As shown in this figure, the electric power steering apparatus 10 includes a torque detection unit 41 for detecting a steering torque T of a steering system 20 of a motor vehicle, an electric motor 43 configured to apply an assist torque to the steering system 20, and a motor control unit 42 for controlling a motor current of the electric motor 43 with reference to the steering torque T. The motor control unit 42 may refer to, not only the steering torque T, but also a vehicle speed V detected by a vehicle speed detection unit 107. Alternatively, the motor control unit 42 may not refer to the vehicle speed V detected by the vehicle speed detection unit 107 in which instance the vehicle speed detection unit 107 can be omitted.

In the embodiment shown in FIG. 1, the motor control unit 42 for controlling the motor current of the electric motor 43 is equipped with a rotational quantity detection unit 130 for detecting a rotational quantity of the electric motor 43 while it is in a wakeup state, and a counter electromotive voltage detection unit 131 for detecting a counter electromotive voltage of the electric motor 43.

While a main power supply of the electric power steering apparatus 10 is in an off state, the motor control unit 42 or the electric power steering apparatus 10 can stop operation of the electric motor 43. In this condition, if the steering wheel 21 of the motor vehicle is operated by the driver, a counter electromotive voltage of the electric motor 43 will be produced. On the other hand, detection of the rotational quantity of the electric motor is not necessary as long as the steering wheel 21 is not operated by the driver. It is therefore sufficient that the rotational quantity detection unit 130 transitions from a sleep state to the wakeup state to thereby perform detection of a rotational quantity of the electric motor only when a prescribed condition is established based on the counter electromotive voltage detected by the counter electromotive detection unit 131 while the main power supply of the electric power steering apparatus is in the off state. In other words, as long as the prescribed condition is not established based on the counter electromotive voltage of the electric motor 43, the rotational quantity detection unit 130 remains in the sleep state, so that electricity consumption required for detection of the rotational quantity of the electric motor 43 can be reduced.

In the embodiment shown in FIG. 1, the rotational quantity of the electric motor 43 to be detected by the rotational quantity detection unit 130 is, for example, a rotational angle θ (absolute electric angle) including the number of revolutions of the electric motor 43. As an alternative, the to-be-detected rotational quantity of the electric motor 43 may be a rotational speed of the electric motor 43, such as detected by the backup circuit shown in JP 2012-46047A specified above. It may be said that a rotational quantity of the electric motor 43 to be detected by the rotational quantity detection unit 130 is determined by a use of a sideslip prevention device or the like external device 203 or a motor current control method achieved by the motor control unit 42. In the case where the external device 203 requires a rotational angle Θ (absolute steering angle) including the number of revolutions of the steering wheel 21, the rotational quantity detection unit 130 not only detects a rotational angle θ (absolute electric angle) including the number of revolutions of the electric motor 43, but also calculates an absolute steering angle Θ using the absolute electric angle θ and a reduction ratio of a reduction mechanism 44 (worm gear mechanism, for example) and outputs or sends the absolute steering angle Θ to the external device 203.

When the main power supply of the electric power steering apparatus 10 is turned off, the rotational quantity detection unit 130 enters into the sleep state. When the proscribed condition is established based on the counter electromotive voltage detected by the counter electromotive voltage detection unit 131, the rotational quantity detection unit 130 transitions from the sleep state to the wakeup state. Operations of the rotational quantity detection unit 130 and the counter electromotive voltage detection unit 131 will be described in greater detail with reference to FIGS. 2 to 5. Referring next to FIG. 1, an operation of the electric power steering apparatus 10 will be described.

As shown in FIG. 1, the electric power steering apparatus 10 is equipped with an assist torque mechanism 40 configured to apply an assist torque to the steering system 20 extending from the steering wheel 21 to steerable road wheels (front wheels, for example) 29, 29 of the motor vehicle. The electric power steering apparatus 10 also includes a rack-and-pinion mechanism 25 as a steering mechanism.

In the steering system 20 shown in FIG. 1, the steering wheel 21 is connected via a steering shaft (steering column) 22 and universal joints 23, 23 to a rotating shaft (pinion shaft) 24. The rotating shaft 24 is connected to a rack shaft 26 via the rack-and-pinion mechanism 25. The rack shaft 26 is connected at opposite ends thereof to the steerable road wheels 29, 29 via tie rods 27, 27 and knuckles 28, 28. The rack-and-pinion mechanism 25 has a pinion 31 provided on the pinion shaft 24 and a rack 32 provided on the rack shaft 26.

With the steering system 20 thus constructed, when the driver operates the steering wheel 21, a steering torque is transmitted via the rack-and-pinion mechanism 25 to the steerable rod wheels 29, 29 to thereby steer the steerable road wheels 29, 29 in a desired direction.

In the embodiment shown in FIG. 1, the assist torque mechanism 40 is configured such that a steering torque T produced in the steering system 20 during operation of the steering wheel 21 is detected by a steering torque sensor or the like torque detection unit 41; based on a detection signal (torque signal) a motor control signal is generated by the motor control unit 42; based on the motor control signal, an assist torque corresponding to the steering torque is produced by the electric motor 43; and the assist torque is transmitted via the reduction mechanism 44 to the rotating shaft. 24 and thence to the rack-and-pinion mechanism 25 in the steering system 20.

It is preferable that the assist torque mechanism 40 uses a vehicle speed V detected by the vehicle speed sensor or the like vehicle speed detection unit 107 while the motor vehicle is traveling in a forward direction. In this case, based on both a vehicle speed signal indicative of the detected vehicle speed V and a torque signal indicative of the detected steering torque T, the motor control unit 42 generates a motor control signal. With this arrangement, the assist torque has a value appropriate for both the steering torque T and the vehicle speed V. As will be discussed later, it is further preferable that the assist torque is determined or corrected by in combination with the steering torque T and the vehicle speed V, a rotational angle θ (rotational signal, relative electric angle) not including the number of revolutions of a rotor of the electric motor 43.

Depending on the position where assist torque is applied to the steering system 20, the electric power steering apparatus 10 can be classified into a pinion assist type, a rack assist type, or a column assist type. The electric power steering apparatus 10 shown in FIG. 1 is of the pinion assist type. It may be possible to apply the electric power steering apparatus 10 to the rack assist type or the column assist type.

In the electric power steering apparatus 10, a composite torque which is a combination of a steering torque applied to the steering system 20 and an assist torque generated by the electric motor 43 is used to steering the steerable road wheels 29, 29 via the rack shaft 26.

The electric motor 43 is a brushless motor, for example. The brushless motor is able to include a resolver or the like rotation sensor. The rotation sensor is configured to detect a motor rotation signal (also called "resolver signal") caused by a rotational angle θ not including the number of revolutions of a rotor. The rotational quantity detection unit 130 incorporated in the motor control unit 42 is able to, not only, detect a rotational angle θ (rotational signal, relative electric angle) not including the number of revolutions of a rotor based on the motor rotation signal (resolver signal) from the rotation sensor (revolver), but also, calculate a rotational angle θ (absolute electric angle) including the number of revolutions of a rotor of the electric motor 43 by counting the number of rotation of the rotor of the electric motor 43. Furthermore, the rotational quantity detection unit 130 is able to calculate rotational angle Θ (absolute steering angle) including the number of revolutions of the steering wheel 21 by using the absolute electric angle θ and the reduction ratio of the reduction mechanism 44.

Figure 2:
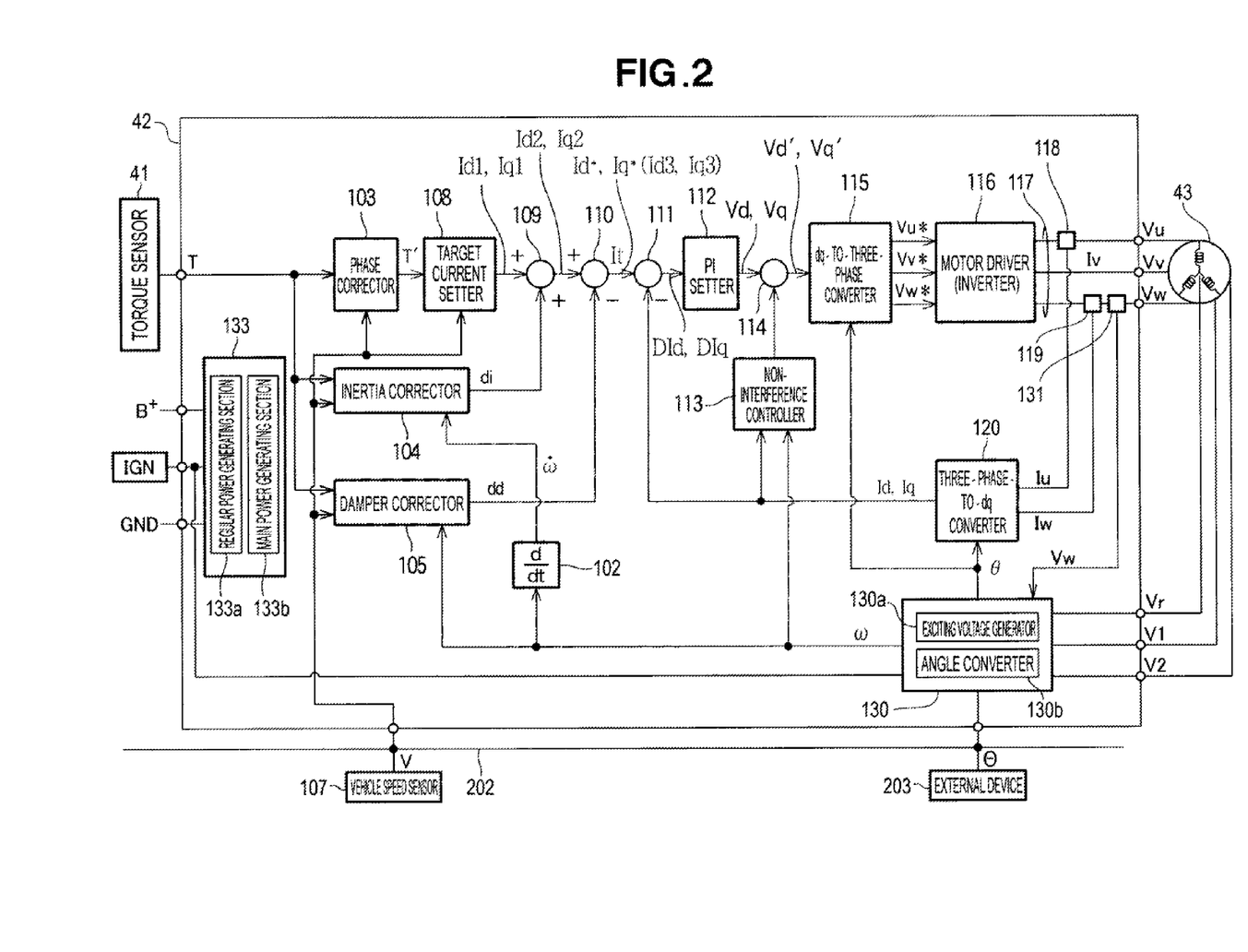
FIG. 2 is a block diagram showing a configuration of a motor control unit of the electric power steering apparatus shown in FIG. 1.

FIG. 2 shows a specific example of a configuration of the motor control unit 42 shown in FIG. 1. In the example shown in FIG. 2, the motor control unit is constituted, for example, by an electronic control unit (ECU) and includes, not only, the rotational quantity detection unit 130 and the counter electromotive voltage detection unit 131 shown in FIG. 1, but also, a power supply circuit 133 including a regular power generating section 133a. In order to control the motor current of the electric motor 43, the motor control unit 42 further includes a differentiating section 102, a phase correcting section 103, an inertia correcting section 104, a damper correcting section 105, a target current setting section 108, an addition operating section 109, a subtraction operating section 110, a deviation computing section 111, a PI setting section 112, a non-interfering control section 113, a computing section 114, a dq-to-three-phase converting section 115, a motor driving section 116, motor current detecting sections 118 and 119, and a three-phase-to-dq converting section 120, such as disclosed, for example, in Japanese Patent Application Laid-open Publication (JP-A) No. 2010-47238. The vehicle speed detection unit 107 is constituted, for example, by an electronic control unit (ECU) and connected to the motor control unit 42 via an on-vehicle network system 202 such as CAN. The motor control unit 42 can receive a vehicle speed V from the vehicle speed detection unit 107 by wire, wireless, or any other system. An external device 203 such as a sideslip prevention device is constituted by an electronic control unit (ECU) and can receive, for example, an absolute steering angle from the motor control unit 42 or the rotational quantity detection unit 130 via an arbitrary system.

As shown in FIG. 2, the power supply circuit 133 includes a main power generating section 133b and the regular power generating section 133a. A regular power line +B and a ground line GND are inputted to the power supply circuit 133. The regular power line +B is connected to a positive terminal of a battery (not shown) installed in the vehicle, and the ground line GND is connected to a negative terminal of the battery or a body of the vehicle. The power supply circuit 133 refers to the state of an ignition switch IGN so that when the ignition switch IGN is in an on state, the main power supply of the electric power steering apparatus 10 is turned on, and when the ignition switch IGN is in an off state, the main power supply of the electric power steering apparatus 10 is turned off.

When the main power supply of the electric power steering apparatus 10 is turned on, the main power generating section 133b of the power supply circuit 133 generates, on the basis of electric potentials of the regular power line +B and the ground line GND, an electric power source for all circuits (such as the target current setting section 108, the motor driving section 116 and so on) excluding the rotational quantity detection unit 130 and the counter electromotive voltage detection unit 131. The motor control unit 42 can drive the electric motor 43 using electric power generated by the main power generating section 133b of the power supply circuit 133. On the other hand, when the main power supply of the electric power steering apparatus 10 is turned off, the main power generating section 133b of the power supply circuit 133 generates no power so that operation of the electric motor 43 is stopped.

While the ignition switch ION is in the on state, the electric power steering apparatus 10 or the motor control unit 42 excluding the rotational quantity detection unit 130 and the counter electromotive voltage detection unit 131 is operating. When the ignition switch IGN is switched into the off state, the electric power steering apparatus and the motor control unit 42 excluding the rotational quantity detection unit 130 and the counter electromotive voltage detection unit 131 are stopped.

The regular power generating section 133a of the power supply circuit 133 always generates a poser source for the rotational quantity detection unit 130 and the counter electromotive voltage detection unit 131 of the motor control unit 42 based on electric potentials of the regular power line +B and the ground line GND. However, if the rotational quantity detection unit 130 always operates to detect a rotational quantity of the electric motor 43 regardless of whether the steering wheel 21 is operated when the main power supply of the electric power steering apparatus 10 is in the off state, the power consumption of the rotational quantity detection unit 130 becomes large (Comparative Example 1). Even if the rotational quantity detection unit 130 intermittently detects the rotational quantity of the electric motor 43 regardless of whether the steering wheel 21 is operated when the main power supply of the electric power steering apparatus 10 is in the off state, the residual capacity of the battery will reduce every time detection of the rotational quantity of the electric motor 43 is executed (Comparative Example 2).

It is therefore desirable that the rotational quantity detection unit 130 and the counter electromotive voltage detection unit 131 of the motor control unit 42 use electric power generated by the regular power generating section 133a to monitor operation of the steering wheel 21 while the main power supply of the electric power steering apparatus 10 is in the off state and also to detect a rotational quantity of the electric motor 43 only when the steering wheel 21 is operated by the driver. More specifically, in the embodiment shown in FIG. 2, while the ignition switch IGN is in the off state, the rotational quantity detection unit 130 is generally in the sleep state. However, when the steering wheel 21 is operated by the driver while the ignition switch IGN is in the off state, the rotational quantity detection unit 130 transitions from the sleep state to the wakeup state and performs detection of a rotational quantity of the electric motor 43. Since the rotational quantity detection unit 130 is activated only when the steering wheel 21 is operated by the driver, power consumption of the rotational quantity detection unit 130 during the off state of the main power supply of the electric power steering apparatus 10 is reduced. Additionally, because detection of the rotational quantity of the electric motor 43 does not take place until the steering wheel 21 is operated by the driver, reduction in the residual capacity of the battery during the off state of the main power supply of the electric power steering apparatus 10 can be suppressed. The counter electromotive voltage detection unit 131 detects a counter electromotive voltage of the electric motor 43 caused by operation of the steering wheel 21 at least during the off state of the main power supply of the electric power steering apparatus 10, and when a prescribed condition is established based on the detected counter electromotive voltage of the electric motor 43, the counter electromotive voltage detection unit 131 sends a wakeup signal to the rotational quantity detection unit 130.

In the embodiment shown in FIG. 2, when the main power supply of the electric power steering apparatus 10 is turned off, the rotational quantity detection unit 130 enters into the sleep state and does not excite the resolver of the electric motor 43. More specifically, while the rotational quantity detection unit 130 is in the sleep state, an exciting voltage generating section 130a of the rotational quantity detection unit 130 does not generate an exciting voltage Vr to be supplied to the resolver, and an angle converting section 30b of the rotational quantity detection unit 130 does not detect a rotational angle θ (relative electric angle) of the electric motor 43 from excitation voltages V1, V2 (detection voltages) from the resolver. On the other hand, when the rotational quantity detection unit 130 transitions from the sleep state to the wakeup state, the exciting voltage generating section 130a of the rotational quantity detection unit 130 generates the exciting voltage Vr. Similarly, when the rotational quantity detection unit 130 transitions from the sleep state to the wakeup state, the angle converting section 130b of the rotational quantity detection unit 130 not only detects the rotational angle θ (relative electric angle) of the electric motor 43 from the excitation voltages V1, V2 (detection voltages) of the resolver, but also counts the number of revolutions of the electric motor 43 to thereby calculate a rotational angle θ (absolute electric angle) including the number of revolutions of the electric motor 43. In this instance, namely when the electrical quantity detection unit 130 transitions from the sleep state to the wakeup state while the main power supply of the electric power steering apparatus 10 is in the off state, the angle converting section 130b of the rotational quantity detection unit 130 may calculate a rotational angle Θ (absolute steering angle) including the number of revolutions of the steering wheel 21 by using the absolute electric angle θ and the reduction ratio of the reduction mechanism 44.

Also in the embodiment shown in FIG. 2, while the main power supply of the electric power steering apparatus 10 is in the on state, that is, while the ignition switch IGN is in the on state, the rotational quantity detection unit 130 is in the on state where the rotational quantity detection unit 130 can excite the resolver of the electric motor 43, detect the rotational angle θ (relative electric angle) of the electric motor 43, and calculate the rotational angle Θ (absolute electric angle) including the number of revolutions of the electric motor 43 and/or the rotational angle Θ (absolute steering angle) including the number of revolutions of the steering wheel 21. The rotational angle θ (absolute electric angle) including the number of revolutions of the electric motor 43 and/or the rotational angle Θ (absolute steering angle) including the number of revolutions of the steering wheel 21 is used in the external device 203 such as the sideslip prevention device. On the other hand, the rotational angle θ (relative electric angle) of the electric motor 43 is used for controlling the motor current of the electric motor 43. More specifically, the rotational quantity detection unit 130 or the angle converting section 130a of the rotational quantity detection unit 130 outputs a signal corresponding to the rotational angle θ (relative electric angle) of the electric motor 43 to the dq-to-three-phase converting section 115 and the three-phase-to-dq converting section 120. Furthermore, the rotational quantity detection unit 130 or the angle converting section 130b of the rotational quantity detection unit 130 calculates a rotation angular speed ω of the electric motor 43 from the rotational angle θ (relative electric angle) of the electric motor 43 and outputs a signal corresponding to the rotation angular speed ω to the differentiating section 102, the damper correcting section 105, and the non-interfering control section 113.

In the embodiment shown in FIG. 2, the rotational quantity detecting section 130 is configured to excite the resolver of the electric motor 43 and detect the rotational angle θ (relative electric angle) of the electric motor 43. However, when the resolver of the electric motor 43 is in failure, or when the electric motor 43 is not equipped with a resolver, the rotational quantity detection section 130 may execute estimation of a rotational angle θ (relative electric angle) of the electric motor 43 and calculate a rotational angle θ (absolute electric angle) of the electric motor 43 and/or a rotational angle Θ (absolute steering angle) of the steering wheel 21. More specifically, the rotational quantity detection unit 130 may perform estimation of the rotational angle θ (relative electric angle) of the electric motor 43 from the rotation angular speed ω of the electric motor 43 based on three phase voltages Vu, Vv, Vw, three detection drive currents Iu, Iv, Iw, and a counter electromotive voltage constant [V/rpm], as disclosed, for example, in Japanese Patent Application Laid-open Publication (JP-A) No. 2009-248962 (paragraphs [0026]-[0029] and [0033]). A motor current control method achieved by the motor control unit 42 (including operations of the dq-to-three-phase converting section 115 and the three-phase-to-dq converting section 120 using the rotational angle θ (relative electric angle) of the electric motor 43, and operations of the differentiating section 102, the damper correcting section 105, and the non-interfering control section 113 using the rotation angular speed ω of the electric motor 43) is described in greater detail below.

Figure 3A:
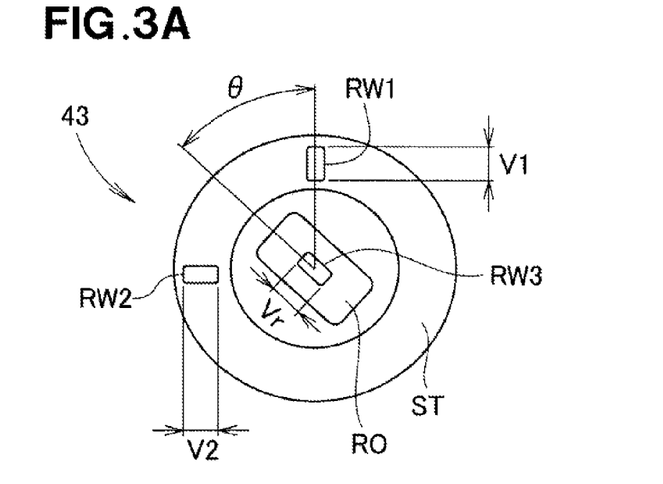
FIG. 3A is a schematic view of a resolver built in a brushless motor of the electric power steering apparatus of FIG. 1.
Figure 3B:
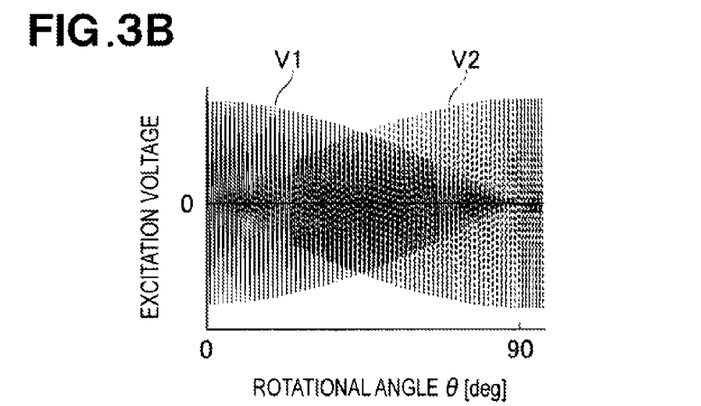
FIG. 3B is a graph showing changes of excitation voltages detected at a pair of resolver windings fixed to a stator when the brushless motor is rotating while a resolver winding fixed to a rotor is excited with a sinusoidal voltage.
Figure 3C:
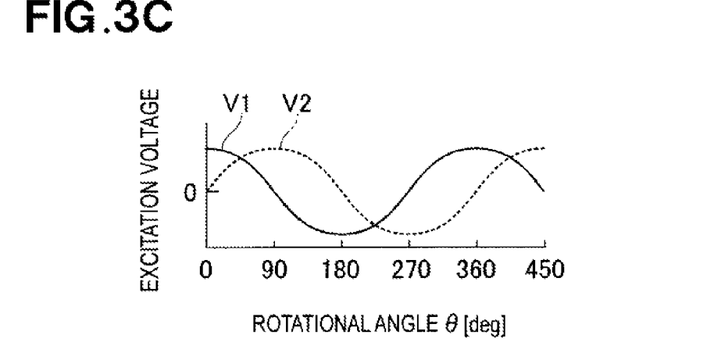
FIG. 3C is a graph showing a relationship between the rotational angle of the motor and the excitation voltages detected at the pair of resolver windings.

FIG. 3A schematically shows a configuration of the resolver built in the electric motor 43. FIG. 38 shows changes of the excitation voltages V1, V2 detected at a pair of resolver windings RW1, RW2 fixed to a stator ST of the electric motor 43 when the electric motor 43 is rotating while a resolver winding RW3 fixed to a rotor RO of the electric motor 43 is excited by a sinusoidal voltage. FIG. 3 shows a relationship between the rotational angle θ of the motor and the excitation voltages V1, V2 detected at the pair of resolver windings RW1, RW2. The rotational quantity detection unit 130 shown in FIGS. 1 and 2 detects a rotational quantity of the electric motor 43 while it is in the wakeup state. More specifically, the rotational quantity detection unit 130 is required to excite or drive the rotation sensor such as the resolver built in the electric motor 43.

As shown in FIG. 3A, the resolver built in the electric motor 43 is constituted by the resolver winding RW3 fixed to the rotor RO of the electric motor 43 and the pair of resolver windings RW1, RW2 fixed to the stator ST of the electric motor 43. The rotational quantity detection unit 130 may excite the resolver winding RW3 fixed to the rotor RO of the electric motor 43 by a sinusoidal voltage Vr (Vr=Vs·sin(2πf·t), where Vs represents the reference voltage, and f represents the excitation frequency. The exciting voltage generating section 130a of the rotational quantity detection unit 130 shown in FIG. 2 applies such exciting voltage Vr to both ends of the resolver winding RW2 fixed to the rotor RO of the electric motor 43. In this instance, excitation voltages V1, V2 (V1=Vs'·sin(2πf·t)·sin θ, V2=Vs'·sin(2πf·t)·cos θ) detected at the pair of resolver windings RW1, RW2 fixed to the stator ST of the electric motor 43 vary with an angle of the rotor RO relative to the stator ST (i.e., a rotational angle θ of the electric motor 43) and the excitation frequency f (exciting voltage Vr), as shown in FIG. 3B. The relationship between the rotational angle θ of the electric motor 43 and the excitation voltages V1, V2 detected at a sampling frequency which is the same as the excitation frequency f is exemplified by FIG. 3C.

The angle converting section 130b of the rotational quantity detection unit 130 can convert the sampled or detected excitation voltages V1, V2 into a rotational angle θ (relative electric angle) of the electric motor 43 by using a relative expression shown in FIG. 3C. Furthermore, the angle converting section 130b also is able to calculate a rotational angle θ (absolute electric angle) of the electric motor 43 including the number of revolutions of the electric motor 43 by cutting up or counting down the number of revolutions of the electric motor 43 each time the rotational angle θ (relative electric angle) of the electric motor 43 passes 360 degrees or 0 degree.

Figure 4:
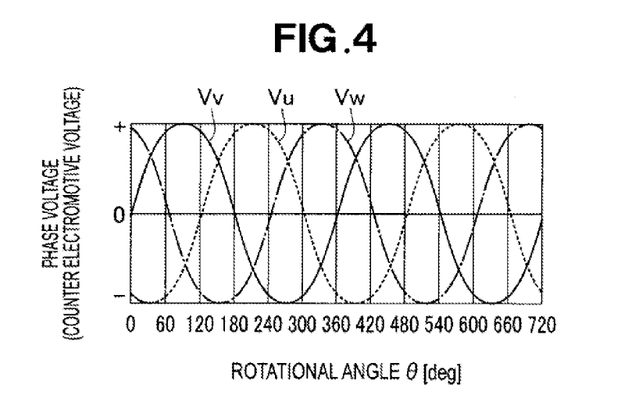
FIG. 4 is a graph showing changes of counter electromotive voltages (U-phase voltage, V-phase voltage and W-phase voltage) of the electric motor produced when a steering wheel of a motor vehicle is operated while a main power supply of the electric power steering apparatus is in an off state.

FIG. 4 shows changes of counter electromotive voltages (U-phase voltage Vu, V-phase voltage Vv, and V-phase voltage Vw) generated when the steering wheel 21 is operated by the driver while the main power supply of the electric power steering apparatus 10 is in the off state. In FIG. 4, if the electric motor 43 has completed two turns in a forward direction at a constant angular speed in response to operation of the steering wheel 21, a counter electromotive voltage of the electric motor 43, namely each of the three phase voltages Vu, Vv, Vw varies to represent a sinusoidal wave according to the rotational angle θ (relative electric angle) of the electric motor 43. In this instance, because one phase voltage (Vv, for example) selected from among the three phase voltages Vu, Vv, Vw advances in phase by ±120 degrees relative to the remaining two phase voltages (Vu and Vw, for example), it is possible to monitor the counter electromotive voltage of the electric motor 43 by detecting a voltage of at least one phase of the electric motor 43. This means that apart from the arrangement shown in FIG. 2, where the counter electromotive voltage detection unit 131 detects or monitors only the W-phase voltage Vw of the electric motor 4, the counter electromotive voltage detection section 131 may be arranged to monitor only the U-phase voltage Vu, or alternatively only the U- and W-phase voltages Vu, Vw, or further alternatively all of the U-, V- and W-phase voltages Vu, Vv, Vw.

In the embodiment shown in FIG. 4, respective amplitudes of the three phase voltages Vu, Vv, Vw depend on the angular speed or velocity of the electric motor 43. When the steering wheel 21 is not operated and, hence, the angular speed of the electric motor 43 is zero, each of the phase voltages Vu, Vv, Vw has a value zero. When the steering wheel 21 is slowly operated and angular speed of the electric motor 43 is small, respective magnitudes of the three phase voltages Vu, Vv, Vw are small. On the other hand, when the steering wheel 21 is abruptly operated and, hence, the angular speed of the electric motor 43 is large, the respective amplitudes of the three phase voltages Vu, Vv, Vw become large. In the case where the counter electromotive voltage detection unit 131 is arranged to detect only the W-phase voltage Vw, at a time when the detected W-phase voltage Vw exceeds a predetermined value (first predetermined value), it can be estimated that the steering wheel 21 is operated by the driver. It is desirable that the predetermined value (first predetermined value) is set to be smaller than an amplitude of the W-phase voltage VW occurring when the steering wheel 21 is slowly operated. Thus, when, for example, the W-phase voltage Vw exceeds the predetermined value (first predetermined value), that is, when a prescribed condition is established, the counter electromotive voltage detection unit 131 generates a wakeup signal and, in response to this wakeup signal, the rotational quantity detection unit 130 transitions from the sleep state to the wakeup state.

It is preferable for the rotational quantity detection unit 130 that when performing detection or monitoring of a rotational angle θ (absolute electric angle) of the electric motor 43 including the number of revolutions of the electric motor 43 while in the wakeup state, the rotational quantity detection unit 130 determines whether or not a change in the rotational angle θ (absolute electric angle) of the electric motor 43 has disappeared. When the change of the rotational angle θ (absolute electric angle) of the electric motor 43 has disappeared, the rotational quantity detection unit 130 is allowed to transition from the wakeup state to the sleep state. This arrangement will reduce power consumption of the rotational quantity detection unit 130.

It is further preferable that the rotational quantity detection unit 130 makes a determination or estimation as to whether an occupant or the driver is present in a passenger compartment of the vehicle. More specifically, the rotational quantity detection unit 130 preferably refers to an on state or an off state of a door lock switch (not shown) of a keyless entry system via the on-vehicle network system 202 (FIG. 2). Even when the ignition switch IGN is in the off state, if the door lock switch is in the off state, it can be estimated that an occupant or the driver is present in the vehicle passenger compartment. In this case, the steering wheel 21 can be operated by the occupant or the driver and, hence, the rotational quantity detection unit 130 remains in the wakeup state. Alternatively, when the door lock switch is turned on while the ignition switch IGN is in the off state, the rotational quantity detection unit 130 is allowed to transition from the wakeup state to the sleep state. In place of the door lock switch, a signal from a weight sensor (not shown) associated with a vehicle seat may be referred to by the rotational quantity detection unit 130, in which instance, when the weight sensor does not detect a weight of the occupant or driver while the ignition switch IGN is in the of state, the rotational quantity detection unit 130 is allowed to transition from the wakeup state to the sleep state.

When the door lock switch is turned off with the rotational quantity detection unit 130 being in the off state, a signal from the door lock switch can be regarded as a wakeup signal. More specifically, in the case where the counter electromotive voltage detection unit 131 does not send a wakeup signal to the rotational quantity detection unit 130, the rotational quantity detection unit 130 can transition from the sleep state to the wakeup state when the door lock switch is turned off. When an occupant or the driver is present in the vehicle passenger compartment, this means that the steering wheel 21 can be operated by the occupant or driver. It is therefore desirable that the rotational quantity detection unit 130 transitions from the sleep state to the wakeup state.

As shown in FIG. 4, the counter electromotive voltage of the electric motor 43, namely, each of the three phase voltages Vu, Vv, Vw, varies with the rotational angle θ (relative electric angle) of the electric motor 43 to represent a sinusoidal wave. Voltages between the three phases, namely, a first line voltage (=Vu−Vw), a second line voltage (=Vv−Vw), and a third line voltage (=Vw−Vu) each vary to represent a sinusoidal wave. This means that instead of making a determination as to whether the W-phase voltage Vw exceeds the predetermined value (first predetermined value), the counter electromotive voltage detection section 131 may determine whether the third line voltage (=Vw−Vu) exceeds a predetermined value (second predetermined value. In an arrangement in which the counter electromotive voltage detection unit 131 detects or monitors at least one phase voltage (for example, the W-phase voltage Vw), the detected phase voltage Vw is liable to be affected by a noise coming through the ground line GND. On the other hand, in an arrangement in which the counter electromotive voltage detection unit 131 detects or monitors at least one line voltage (for example, the third line voltage (=Vw−Vu)), the detected third line voltage (=Vw−Vu) is unlikely to be affected by a noise coming through the ground line GRD. Obviously, the counter electromotive voltage of the electric motor 43, which is comprised of the third line voltage (=Vw−Vu) rather than the W-phase voltage Vw, is highly resistant to noise.

Furthermore, instead of making a determination as to whether the counter electromotive voltage of the electric motor 43 (for example, the W-phase voltage Vw or the third line voltage (=Vw−Vu)) exceeds the predetermined value (the first predetermined value or the second predetermined value), the counter electromotive voltage detection unit 131 may determine whether the counter electromotive voltage of the electric motor 42 (for example, the W-phase voltage Vw or the third line voltage (=Vw−Vu)) inverts. In the embodiment shown in FIG. 4, the counter electromotive voltage of the electric motor 43, namely each of the three phase voltages Vu, Vv, Vw inverts depending on the rotational angle θ (relative electric angle) of the electric motor 43. It is therefore possible to detect or monitor operation of the steering wheel 21 through detection or monitoring of at least one phase voltage or at least one line voltage. In an arrangement in which the counter electromotive voltage detection unit 131 determines whether the counter electromotive voltage of the electric motor 43 exceeds the predetermined value (the first predetermined value or the second predetermined value), a difficulty arises in setting the predetermined value. On the other hand, in an arrangement in which the counter electromotive voltage detection unit 131 determines whether the counter electromotive voltage of the electric motor 43 inverts, setting of an inversion reference to zero can be achieved with ease. As the prescribe condition, a condition where the counter electromotive voltage of the electric motor 43 inverts, is advantageous over a condition where the counter electromotive voltage of the electric motor 43 exceeds a predetermined value (a first predetermined value or a second predetermined value) in that the counter electromotive voltage detection unit 131 is easy to construct and improved in accuracy.

The prescribed condition may be a condition where an integrated value of the counter electromotive voltage (for example, the W-phase voltage Vw, or the third line voltage (=Vw−Vu)) of the electric motor 43 exceeds a predetermined value (a third predetermined value, or a fourth predetermined value). The third predetermined value may be set to an integrated value of the counter electromotive voltage during a time period, which is required for the amplitude of the W-phase voltage Vw to reach a predetermined value (first predetermined value) after the W-phase voltage Vw inverts while the steering wheel 21 is slowly operated. The fourth predetermined value may be set to an integrated value of the counter electromotive voltage during a time period, which is required for the amplitude of the third line voltage (=Vw−Vu) to reach a predetermined value (second predetermined value) after the third line voltage (=Vw−Vu) inverts while the steering wheel 21 is slowly operated. An arrangement in which the prescribed condition is a condition where an integrated value of the counter electromotive voltage exceed a predetermined value (a third predetermined value or a fourth predetermined value) is advantageous over a second arrangement in which the prescribed condition is a condition where the counter electromotive voltage of the electric motor 43 exceeds a predetermined value (a first predetermined value or a second predetermined value) in that a higher resistance to noise coming through from the ground line GND can be achieved.

Figure 5:
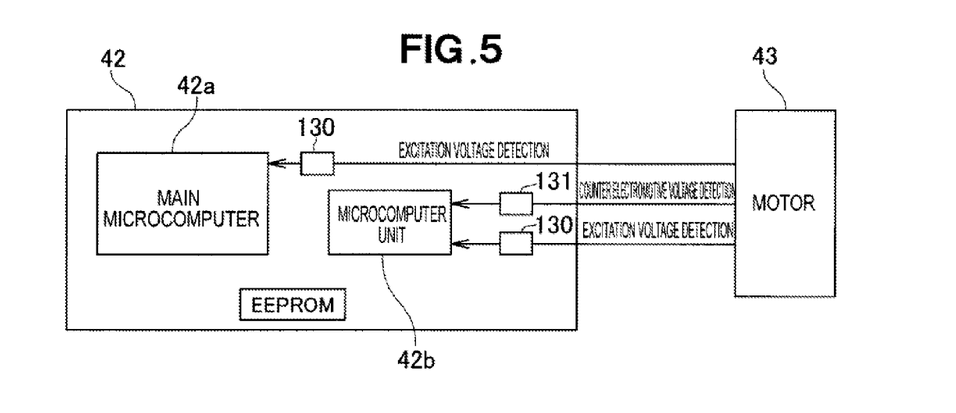
FIG. 5 is a block diagram showing an arrangement of a rotational quantity detection unit and a counter electromotive voltage detection unit of the electric power steering apparatus of FIG. 1.

FIG. 5 shows in block diagram an arrangement of the rotational quantity detection unit 130 and the counter electromotive voltage detection unit 131 shown in FIG. 1. In the arrangement shown in FIG. 5, the motor control unit 42 is constituted by an electronic control unit (ECU) including two microcomputers; one microcomputer is a main microcomputer 42a, and the other microcomputer is a microcontroller unit 42b. The motor control unit 42 includes two rotational quantity detection units 130, 130 electrically connected to the main microcomputer 42a and the microcontroller unit 42b, respectively. The main microcomputer 42a realizes a motor current control method when the motor control unit 42 operates while the main power supply of the electric power steering apparatus 10 is in the on state. The microcontroller unit 42b realizes a steering wheel monitoring method when the motor control unit 42 operates while the main power supply of the electric power steering apparatus 10 is in the off state.

While the main power supply of the electric power steering apparatus 10 is in the on state, the first rotational quantity detection unit 130 corresponding to the main microcomputer 42a remains in the wakeup state for rotational quantity detection and excites the resolver of the electric motor 43 so as to calculate a rotational angle θ (absolute electric angle) including the number of revolutions of the electric motor 43. During that time, the second rotational quantity detection unit 130 corresponding to the microcontroller unit 32b remains in the sleep state. When the main power supply of the electric power steering apparatus 10 shifts from the on state to the off state, the first rotational quantity detection unit 130 writes the calculated rotational angle θ (absolute electric angle) of the electric motor 43 into a nonvolatile storage device, such as an EEPROM of the motor control unit 42 and then transitions from the wakeup state to the sleep state.

When the main power supply of the electric power steering apparatus 10 shifts from the on state to the off state, the second rotational quantity detection unit 130, in principle, continues its sleep state. While the main power supply of the electric power steering apparatus 10 is in the off state, or while both of the first and second rotational quantity detection units 130, 130 do not calculate a rotational angle θ (absolute electric angle) of the electric motor 43, the counter electromotive voltage detection unit 131 detects a counter electromotive voltage of the electric motor 43 and, when a prescribed condition is established based on the detected counter electromotive voltage, the counter electromotive voltage detection unit 131 generates a wakeup signal.

When the main power supply of the electric power steering apparatus 10 is turned off, the second rotational quantity detection unit 130, in principle, transitions from the sleep state to the wakeup state in response to the wakeup signal received from the counter electromotive voltage detection unit 131. In this instance, the second rotational quantity detection unit 130 refers to a rotational angle θ (absolute electric angle) of the electric motor 43 stored in the EEPROM and calculates an amount of change δθ (absolute electric angle) from the rotational angle θ stored in the EEPROM. The second rotational quantity detection unit 130 may transition from the wakeup state to the sleeve state after a change in the change amount 80 (absolute electric angle) has disappeared.

If the first rotational quantity detection unit 130 is in the sleep state when the second rotational quantity detection unit 30 transitions from the wakeup state to the sleep state, the second rotational quantity detection unit 130 updates the rotational angle θ (absolute electric angle) stored in the EEPROM with the calculated change amount δθ (absolute electric angle) and writes the updated rotational angle θ (absolute electric angle) into the EEPROM.

In the case where the second rotational quantity detection unit 130 is in the sleep state when the main power supply of the electric power steering apparatus 10 is shifted from the off state to the on state, the second rotational quantity detection unit 130 continues its off state. In the case where the second rotational quantity detection unit 130 is in the wakeup state when the main power supply of the electric power steering apparatus 10 shifts from the off state to the on state, the second rotational quantity detection unit 130 transitions from the wakeup state to the sleep state. In this instance if the first rotational quantity detection unit 130 is in the wakeup state, the second rotational quantity detection unit 130 may send or transmit the calculated change amount δθ (absolute electric angle) to the first rotational quantity detection unit 130. The first rotational quantity detection unit 130 will update the rotational angle θ (absolute electric angle) stored in the EEPROM with the transmitted change amount δθ (absolute electric angle).

The battery (first battery) installed in the vehicle may be removed for maintenance of the vehicle. In this case, the first and second rotational quantity detection units 130 cannot keep the wakeup state. Similarly, the counter electromotive voltage detection unit 131 is unable to generate a wakeup signal. In order to continue calculation of the rotational angle (absolute electric angle) θ of the electric motor 43 even when the first battery is removed from the vehicle, the vehicle is preferably provided with a second battery (not shown). Thus, the electric power steering apparatus 10 can continue calculation of the rotational angle θ (absolute electric angle) of the electric motor 43 using electric power supplied from either one of the first battery and the second battery.

In the case where the vehicle is not provided with the second battery, the electric power steering apparatus 10 may alternatively determine whether or not a preset value stored in a volatile storage device such as RAM is maintained. If the RAM, which is built in the ECU or microcomputer of the electric power steering apparatus 10, is initialized due to removal of the first battery, the electric power steering apparatus 10 sends an alarm signal via the on-vehicle network system 202 to a meter ECU, which, in turn, turns on an alarm lamp (not shown) of a meter unit. This will enable the driver to recognize that a rotational angle (absolute electric angle) θ used in the external device 203 such as the sideslip prevention device may not be accurate. It is preferable that upon activation of the alarm lamp, operation of the external device 203 is stopped.

Even when the rotational angle θ (absolute electric angle) of the electric motor 43 is not accurate, the electric power steering apparatus 10 is able to learn or use a middle point of the rotational angle θ (absolute electric angle) of the electric motor 43, or a middle point of the rotational angel Θ (absolute steering angle) of the steering wheel 21 while the vehicle is traveling straight (more specifically when the steering torque T is zero and the vehicle speed V is greater than a predetermined value) and calibrate or rewrite the rotational angles (absolute electric angle and absolute steering angle) θ and Θ. Thereafter, the electric power steering apparatus 10 terminates generation and sending of the alarm signal to turn off the alarm lamp and allows the external device 203 such as the sideslip prevention device to restart operation.

Referring back to FIG. 2, the motor current control method achieved by the motor control unit 42 will be described in detail. The steering torque detecting section 41 inputs a steering torque signal T to the phase correcting section 103. The phase correcting section 103 corrects phase of the steering torque signal T based on a vehicle speed signal V inputted from the vehicle speed detecting unit 107 and outputs a corrected steering torque signal T' to the target current setting section 108. The differentiating section 102 differentiates a signal corresponding to a rotation angular speed ω to obtain an angular acceleration (time differential value of the rotation angular speed ω) and sends a signal corresponding to the angular acceleration to the inertia correcting section 104. From the steering torque signal T, the vehicle speed signal V and the angular acceleration signal, the inertia correcting section 104 generates an inertia correction signal di for performing inertia correction in terms of inertial moment and outputs the inertia correction signal di to the addition operating section 109. The damper correcting section 105, on the basis of the steering torque signal T from the steering torque detecting unit 41, the vehicle speed signal V from the vehicle speed detecting unit 107, and the signal corresponding to the angular acceleration ω, generates a damper correction signal dd for performing damper correction in terms of a damping coefficient and outputs the damper correction signal dd to the subtraction operation section 110.

The target current setting section 108 calculates target currents Id1, Iq1 of two phases based on the corrected steering torque signal T' and the vehicle speed signal V. The target currents Id1, Iq1 correspond to a d-axis in the same direction with permanent magnets and a q-axis perpendicular to the d-axis in a rotary coordinate system which is in synchronism with a rotary magnetic flux generated by the permanent magnets on an inner rotor of the brushless motor (electric motor) 43. The target currents Id1 and Iq1 will be referred to as "d-axis target current Id1" and "q-axis target current Iq1", respectively.

The target current setting section 108 outputs the target currents Iq1, Id1 to the addition operating section 109. The addition operating section 109 adds the inertia correction signal di to each of the target currents Id1, Iq1 and outputs adding values, i.e., inertia-corrected target current Id2, Iq2. The subtraction operation section 110 subtracts the damper correction signal dd from each of the inertia-corrected target currents Id2, Iq2 and outputs subtraction values, i.e., damper-corrected target currents Id3, Iq3. The damper-corrected target currents Id3 and Iq3 will be referred to as "d-axis final target current Id*" and "q-axis final target current Iq*", respectively. The deviation computing section 111 subtracts from the d-axis and q-axis final target currents Id* and Iq* detection currents Id and Iq of the d-axis and q-axis inputted from the three-phase-to-dq converting section 120 and outputs subtraction values, i.e., deviations DId and DIq to the P1 setting section 112.

The PI setting section 112 executes calculation using the deviations DId and DIq to thereby calculate target voltages Vd and Vq of the d-axis and the q-axis, respectively, such that the detected d-axis and q-axis currents Id and Iq will follow the d-axis and q-axis final target currents Id* and Iq*, respectively. The non-interference control section 113 and the computing section 114 correct the d-axis target voltage Vd and the q-axis target voltage Vq into a d-axis corrected target voltage Vd' and a q-axis corrected target voltage Vq' and outputs the corrected target voltages Vd', Vq' to the dq-to-three-phase converting section 115. More specifically, the non-interference control section 113, on the basis of the d-axis detection current Id and the Taxis detection current Iq inputted from the three-phase-to-dq converting section 120 and the rotation angular speed Ω of the inner rotor inputted from the rotational quantity detection unit 130, calculates a non-interference control correction value for the d-axis and q-axis target voltages Vd and Vq. The computing section 114 subtracts the non-interference control correction value from each of the d-axis and q-axis target voltages Vd and V1 to thereby calculate the d-axis and q-axis corrected target voltages Vd' and Vq' and outputs the corrected target voltages Vd' and Vq' to the dq-to-three-phase converting section 115.

The dq-to-three-phase converting section 115 converts the d-axis and q-axis corrected target voltages Vd' and Vq' into target voltages Vu*, Vv* and Vw* of three phases and outputs the target voltages Vu*, Vv*, Vw* to the motor driving section 116. The motor driving section 116 includes a PWM voltage generating part (not shown) and an inverter circuit. The PWM voltage generating part generates PWM control voltage signals UU, VU, WU corresponding to the three-phase target voltages Vu*, Vv*, Vw*, respectively, and outputs the PWM control voltage signals UU, VU, WU to the inverter circuit. The inverter circuit generates three-phase AC drive currents Iu, Iv, Iw corresponding to the PWM control voltage signals UU, VU, WU, respectively, and supplies the three-phase AC drive currents Iu, Iv, Iw via three-phase drive current paths 117 to the brushless motor (electric motor) 43. The three-phase AC drive currents Iu, Iv, Iw are sinusoidal wave currents for PWM driving the brushless motor (electric motor) 43.

Two of the three phases of the three-phase drive current paths 117 are provided with the motor current detecting sections 118 and 119. The motor current detecting sections 118, 119 detect drive currents Iu, Iw of the two phases among the drive currents Iu, Iv, Iw of three phases and output the detected drive currents Iu, Iw to the three-phase-to-dq converting section 120. The three-phase-to-chi converting section 120 calculates a drive current Iv of the remaining phase based on the detected drive currents Iu, Iw. Furthermore, the three-phase-to-dq converting section 120 converts the detected currents Iu, Iv, Iw of three phases into a d-axis detection current Id and a q-axis detection current Iq.

In FIG. 2, the addition operating section 109, the subtraction operating section 110, the deviation computing section 111, the PI setting section 112 and the computing section 114 are shown in a single set for purposes of illustration. In practice, this set of circuit elements is provided separately for each of the two target currents Id1 and Id2.

Obviously, various minor changes and modifications of the present invention are possible in the light of the above teaching. It is therefore to be understood that within the scope of the appended claims the invention may be practiced otherwise than as specifically described.

What is claimed is:

1. An electric power steering apparatus, comprising:
a main power supply for supplying electric power to the electric power steering apparatus;
an electric motor configured to apply an assist torque to an steering system of a motor vehicle;
a rotational quantity detection unit for detecting a rotational quantity of the electric motor while the rotational quantity detection unit is in a wake-up state; and
a counter electromotive voltage detection unit for detecting a counter electromotive voltage of the electric motor,
wherein when the main power supply is turned off, the rotational quantity detection unit enters into a sleep state, and wherein when a prescribed condition is established based on the counter electromotive voltage detected by the counter electromotive voltage detection unit, the rotational quantity detection unit transitions from the sleep state to the wakeup state.

2. The electric power steering apparatus according to claim 1, wherein the electric motor comprises a brushless motor, and the counter electromotive detecting section detects the counter electromotive voltage based on a voltage of at least one phase of the brushless motor.

3. The electric power steering apparatus according to claim 1, wherein the prescribed condition is a condition where the counter electromotive voltage exceeds a predetermined value.

4. The electric power steering apparatus according to claim 1, wherein the prescribed condition is a condition where the counter electromotive voltage inverts.

5. The electric power steering apparatus according to claim 1, wherein the prescribed condition is a condition where an integrated value of the counter electromotive voltage exceeds a predetermined value.

\* \* \* \* \*